United States Patent [19]

Goettler et al.

[11] Patent Number: 5,125,752

[45] Date of Patent: Jun. 30, 1992

[54] MIXER

[75] Inventors: Hans J. Goettler, Fargo, N. Dak.; Victoria D. Kuntz, Cleveland, Ohio

[73] Assignee: NDSU-Research Foundation, Fargo, N. Dak.

[21] Appl. No.: 621,447

[22] Filed: Nov. 6, 1990

[51] Int. Cl.[5] .............................................. B01F 5/06
[52] U.S. Cl. .................................... 366/348; 366/336; 366/349
[58] Field of Search .............. 366/176, 336, 337, 338, 366/340, 348, 349, 190, 194–196, 262, 267, 255, 256; 422/131, 132, 133

[56] References Cited

U.S. PATENT DOCUMENTS

| | | | |
|---|---|---|---|
| 3,185,447 | 5/1965 | Hach | 366/336 |
| 3,330,444 | 7/1967 | Raypholtz | 222/137 |
| 3,664,639 | 5/1972 | Lander | 366/336 |
| 3,746,216 | 7/1973 | Frederick | 222/137 |
| 3,941,355 | 3/1976 | Simpson | 259/4 |
| 4,014,463 | 3/1977 | Hermann | 222/145 |
| 4,081,863 | 3/1978 | Rees | 366/176 |
| 4,452,917 | 6/1984 | Proksa et al. | 521/50 |
| 4,538,920 | 9/1985 | Drake | 366/177 |
| 4,747,517 | 4/1988 | Hart | 222/137 |
| 4,753,536 | 6/1988 | Spehar et al. | 366/339 |
| 4,771,919 | 9/1988 | Ernst | 222/134 |
| 4,801,008 | 1/1989 | Rich | 206/219 |

Primary Examiner—Robert W. Jenkins
Attorney, Agent, or Firm—Robert C. Baker

[57] ABSTRACT

This shear mixer for polymeric material has two mateable bodies that, when pressed in mating condition together, form a reverse flow path for the movement of the material being mixed. The mixer has two mixing gaps, each defined by a primary wall surface on one body and an opposing wall surface on the other. Contractive movement of the two bodies together effectively causes the linear length of each mixing gap to increase and also causes one wall of each mixing gap to move in a direction opposite to the flow of material through the mixing gap. The mixing method involves not only increasing the length of a mixing gap as material is pushed through it for mixing, but also causing flow of material through one mixing gap to be in a direction opposite but parallel to the flow of material through the other mixing gap.

20 Claims, 2 Drawing Sheets

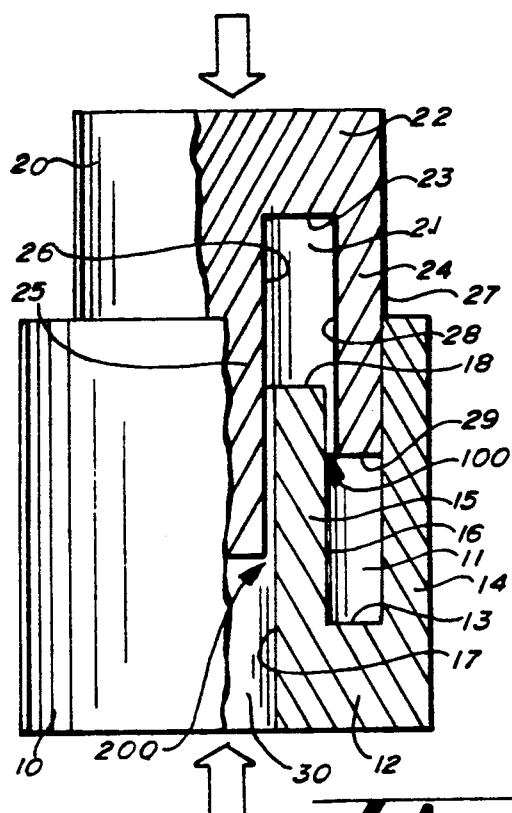
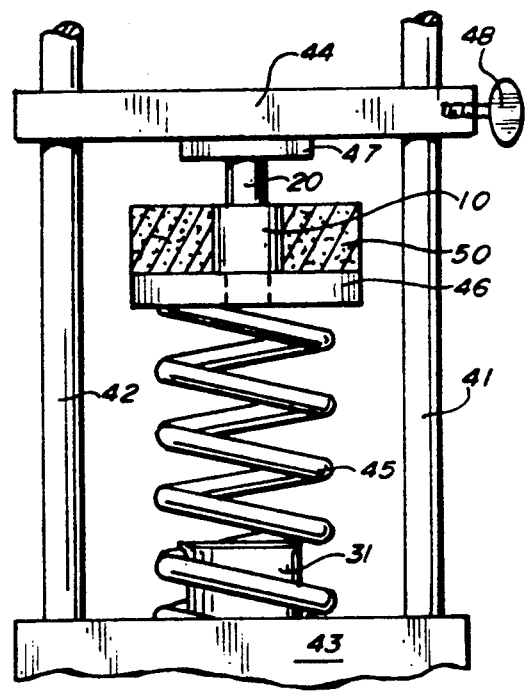
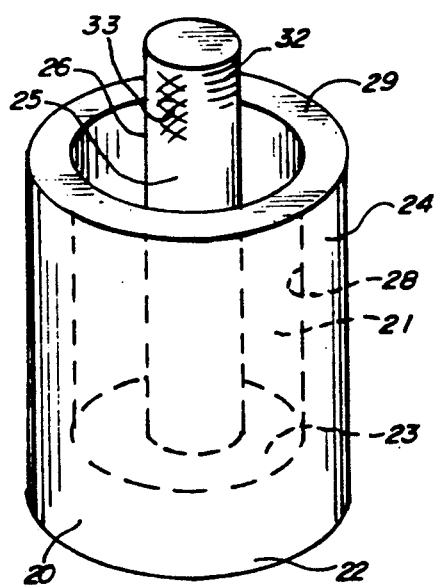
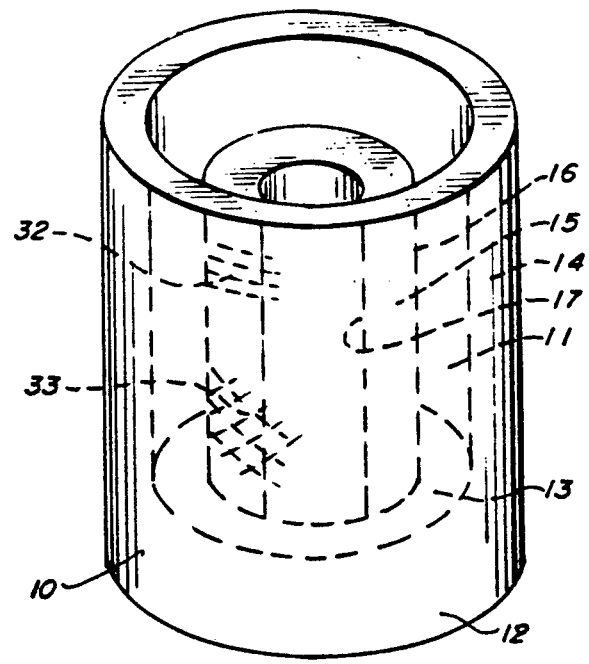
Fig. 3.  Fig. 4.
Fig. 2.  Fig. 1.

MIXER

BACKGROUND OF THE INVENTION

This invention relates to a new mixing system, and more particularly to a new apparatus and a new method for more intimately mixing a premix or preliminary mixture of materials, especially polymeric materials.

The teachings of the invention are especially useful for the shear mixing of polymeric materials. Shear mixing is a highly dispersive type of mixing. It is to be distinguished from distributive mixing which commonly consists of stirring powdery ingredients or materials together. Highly efficient shear mixing effectively converts a distributive mixture into one exhibiting more or less uniform properties throughout the mass thereof, whereas in a distributive mixture the individual component properties are usually quite evident when the distributive mixture is subjected to testing.

Significant value and benefits arise from converting a premix of relatively distributive character into a shear mixed mass, and this is especially evident in the polymeric or plastics art. The dispersive effects of shear mixing are frequently desired to provide an improved and uniform quality for a polymer or mixture of polymers mixed with other materials or ingredients such as plasticizers, extenders, curing or cross-linking agents, and almost any other component or ingredient (even pigments) as those of skill in polymer compounding art may desire. Effective shear mixing reaches down to the molecular level, pulling and stretching polymeric molecules and parts and intertwining them with other components of the mass being shear mixed.

While the invention is especially useful for shear mixing, it should be understood that the teachings of this invention are not solely limited to shear mixing. Further, they are not solely limited to the most efficient shear mixing of which they are capable. It is a fair statement however to say that the teachings of the invention are directed to apparatus and methods for more intimately mixing ingredients or materials, usually and preferably with some type of shearing action.

It is also acknowledged that shear mixing of polymer masses as such is old technology. However, insofar as is known, the apparatus and methods employed in shear mixing as heretofore conducted are vastly different from the apparatus and methods of this invention. Heretofore known commercially available shear mixing apparatus is relatively complex and expensive. It is useful for large volume shear mixing, but not for the shear mixing of laboratory quantities for experimental or test purposes. Known apparatus designed especially for laboratory shear mixing is relatively expensive (about six figures in cost), and effective use of it still requires a relatively large quantity of material for treatment. Much desired has been a relatively economical and effective shear mixing apparatus and methods capable of scaled down economical laboratory shear mixing for low gram quantities as well as for somewhat larger laboratory quantities as experimental progress is made. It is to a solution of this problem that this invention is primarily directed.

A very significant benefit of the invention making it especially valuable for laboratory use is the ease by which apparatus of the invention can be dismantled and cleaned--using, of course, an appropriate solvent for the residuum of the polymeric mass to be washed away.

SUMMARY OF THE INVENTION

The invention provides relatively economical apparatus and methods for more intimately mixing a polymeric premix mass. There are several features or characteristics of the invention, each of which is believed to be unique and unheard of heretofore.

One feature is that of pushing a polymeric mass through a mixing gap defined by spaced wall surfaces while at the same time increasing the length of the gap as the mass is pushed through it.

Another is that of moving one wall surface of the gap relative to the other, and particularly in a direction opposite to the direction of the movement of the mass through the gap.

A still further unique feature is that of passing material to be mixed through a gap in a direction called a first direction and then passing those materials through a second gap in a direction opposite and essentially parallel to the direction of movement of the materials through the first gap.

Mixing apparatus of the invention comprises a first body having a primary wall surface for a gap, and a second body having an opposing wall surface for the gap. The second body is oriented to the first body so that the opposing wall surface is parallel to and spaced from the primary wall surface. Contractive movement of the first and second bodies in a linear direction parallel with the primary and opposing wall surfaces of the gap is effective to lengthen the linear length of the gap during the passage of materials through the gap.

A preferred mixing apparatus of the invention comprises two mateable bodies that, when pressed in mating condition together, form a first gap defined by spaced wall surfaces through which materials being mixed pass in a first direction and a second gap defined by spaced wall surfaces through which the materials pass in a second direction. The second direction is opposite and essentially parallel to the first direction.

In more detail, mixing apparatus of the invention comprises first and second mateable bodies. The first body defines an annular premix space having a terminal base wall. An outer annular housing wall extends from the terminal base wall on the radially outer side of the premix space, and an inner annular base plunger extends from the terminal base wall on the radially inner side of the premix space. The annular base plunger defines at its radially outer side a primary wall surface for a linear first gap and defines at its radially inner side an opposing wall surface for a linear second gap.

The second body defines an annular intermediate space having a terminal limit wall. An annular primary plunger extends from the terminal limit wall on the radially outer side of the intermediate space, and an inner annular core wall extends from the terminal limit wall on the radially inner side of the intermediate space. The annular primary plunger defines at its radially outer side a surface for sealing relationship with the interior surface of the housing wall of the first body, and defines at its radially inner side an opposing wall surface for the linear first gap. The annular core wall defines at its radially outer side the primary wall surface for the linear second gap.

The bodies are mateable in a manner such that the primary and opposing wall surfaces of both gaps are in parallel relationship.

The apparatus additionally includes any suitable means of any type for pressing the first and second bodies together in a mating relationship such that the primary plunger of the second body functions to push material out of the premix space through the linear first gap into the intermediate space, while the annular base plunger simultaneously is moved into said intermediate space and contributes to the pushing of material out of the intermediate space through the linear second gap. The opposing walls of both the first and second gaps are moved in a direction opposite to the passage of material through those gaps as the bodies are pressed together.

Still further benefits and advantages and features of the invention will be evident as this description proceeds.

BRIEF DESCRIPTION OF THE DRAWING

FIG. 1 is a schematic perspective view of a first body for mixing apparatus of the invention;

FIG. 2 is a schematic perspective view of a second body for the mixing apparatus;

FIG. 3 is a schematic side view, partially in section, of the first and second bodies of the mixing apparatus in connected condition at or near an early stage of the contractive movement of the same together for mixing;

FIG. 4 is a schematic side view of one suitable apparatus for effecting contractive force or pressures on the first and second bodies;

DESCRIPTION OF THE PREFERRED EMBODIMENT

Figure 5:
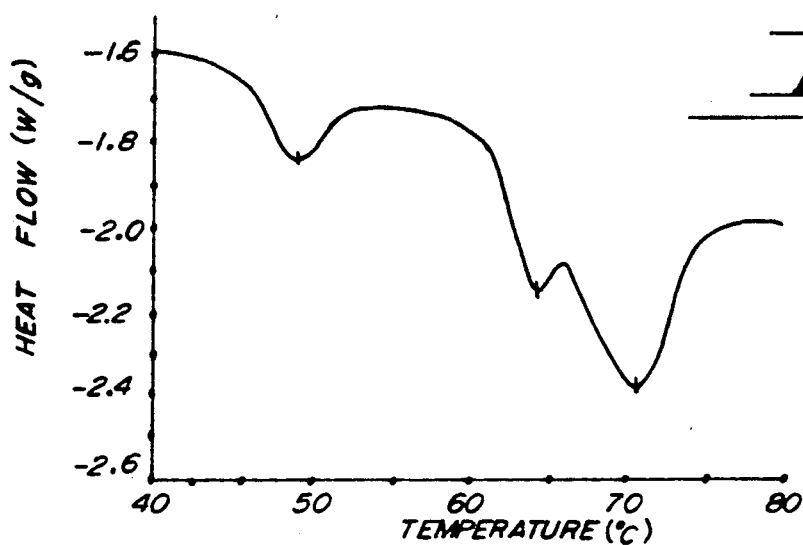
FIG. 5 is a plot illustrating the three glass transition temperatures for the three individual resin components of a four component polymer system mechanically mixed in powder form, before any shear mixing.

Referring particularly to FIGS. 1, 2 and 3, the features and characteristics of the preferred mixer of the invention will first be described. It comprises two bodies 10 and 20 which sometimes are called cups. Each cup may consist of a single piece or be assembled from several individual parts. It is convenient to refer to the first body 10 as a base or foundation or lower or bottom body or cup. Thus, the second body 20 is distinguished by use of terms such as the upper or top or auxiliary body or cup. The two bodies fit together in a cooperative manner and suitably are characterized as being mateable. They are not perfect mirror complement images of each other, although they are close to that if one ignores differences in the size of some annular parts and in some refinements of preferred detail. The use of terms such as upper or lower or top or bottom in describing the two bodies should not be construed to mean that the orientation of the two bodies during a mixing operation must always be as illustrated in FIG. 3. It is possible to effect the contraction employed in the mixing operation when the bodies are oriented in a position upside down from that illustrated in FIG. 3 or in any angular or even lateral or horizontal condition. By far the most preferred orientation, however, is illustrated in FIG. 3.

The first body defines an annular premix space 11 having a terminal base wall 12 that provides a lower bottom interior or terminal surface 13 for the axial or longitudinal direction of space 11. The first body is also shaped to define an outer annular housing wall 14 extending from the terminal base wall 12 on one side of the annular premix space 11. Further, it defines an inner annular base plunger 15 extending from the terminal base wall on the other side of the annular premix space. The inner annular plunger 15 is radially inward from the radially outward housing wall 14. The plunger 15 defines at its outer perimeter or radially outer side a primary wall surface 16 for a linear first gap 100 and defines at its inner perimeter or radially inner side an opposing wall surface 17 for a linear second gap 200. The annular plunger 15 preferably has a piston or fattened end 18. It should be noted that the illustrated first body is generally cylindrical at its outer surface and suitably is flat and planar at its bottom exterior surface, although other outer or exterior configurations may be suitable. Most ideally the walls, and particularly the surfaces of the annular walls forming the gaps, are cylindrical throughout the structure of the first body. Variations from purely cylindrical surfaces for the annular walls are possible, provided the gap surfaces at each radial orientation are axially parallel; and it will be evident that if one body is so formed, complementary and cooperative variations then should be built into the other body.

The second body 20 is shaped to define an annular intermediate space 21 having a terminal limit wall 22 that provides an interior limit surface 23 for the axial direction or longitudinal direction of space 21. The shape of the second body defines an annular primary plunger 24 and an inner annular core wall 25. The radially outer annular primary plunger 24 extends from the terminal limit wall 22 on one side or radially outer side of the intermediate space 21. The inner annular core wall 25 extends from the terminal limit wall 22 on the other or radially interior side of the intermediate space 21. Core wall 25 may be hollow or comprise an axially centered cylindrical shaft or the like. It defines at its outer perimeter or outer side the annular first or primary wall surface 26 of the linear second gap 200. The annular primary plunger 24 defines at its radially outer side a surface 27 for sealing relationship to the interior surface of the housing wall 14 of the first body, and defines at its radially inner side the opposing wall surface 28 for the linear first gap 100. A piston end surface 29, preferably flat, is on the primary plunger 24.

At this point it should be noted that the first or primary wall surface 16 for the first gap 100 is carried on the first body 10 or base cup, whereas the second or opposing wall surface 28 for the first gap 100 is carried on the second body 20 or upper cup. Similarly, the first or primary wall surface 26 of the second gap 200 is carried on the second body or upper cup, whereas the second or opposing wall surface 17 for the second gap 200 is carried on the first body 10 or base. The gaps 100 and 200 are annular and their linear length is in the axial or longitudinal direction (i.e., perpendicular to the radial direction). The width of the gaps is in the radial direction. Further to be noted is that, as the first and second bodies are pressed together, the length of each gap is increased.

It has been stated above that each body carries an annular plunger. The annular plunger carried on the first or base body is suitably characterized as a base plunger 15 whereas the annular plunger carried on the second or upper body is suitably characterized as a primary plunger 24. The distinction is better appreciated when one realizes that the "base plunger" functions on the order of a flow path guide since materials undergoing mixing flow on each side of it, but in opposite directions, while at the same time the piston end 18 of the base plunger (on contraction of the first and second bodies) presses against material in the intermediate space, constantly reducing the size of the intermediate space. It thus functions as a "plunger" in the sense of pushing or forcing material out of (i.e., to leave) the intermediate space as it relentlessly enters the intermediate space and reduces the size of that space on continued contractive movement of the two bodies together. The primary plunger 24 of the second body provides the frontal or primary piston end 29, and piston end 29 functions as the primary means for the pushing or forcing of materials through the gaps of the mixer as the bodies are contracted or pressed together.

Mixed material exits from the mixer at a central location illustratively defined by opposing wall surface 17, and this is suitably characterized as an extrudate exit 30.

Any suitable means may be employed for the purpose of pressing the first and second bodies contractively together. Pressing the bodies together effects the mixing operation in a manner such that a premix in flowable or molten form in the premix space 11 is passed or travels or is forced through the first gap 100 as a result of the annular primary plunger of the second body moving into the premix space and thereby pushing or forcing material of the premix through the first gap 100 into the intermediate space 21. Continued contraction of the first and second bodies in a mating relationship effectively causes material in the intermediate space 21 to travel through the second gap 200 as a result of the annular base plunger 15 on the first body moving into the intermediate space 21 or, stated vice-versa, as a result of the intermediate space terminal limit wall 23 descending upon the base plunger 15. Regardless of how one views it, the size of the intermediate space is reduced and material exits from the intermediate space through the second gap and out the extrudate exit 30.

Means for pressing the first and second bodies together in a mating relationship may comprise or consist of placing a weight on the top surface of the second body after orienting the same as illustrated in FIG. 3. The force of the weight should of course be sufficient to effect contraction of the bodies and forced flow of the material to be mixed through the gaps. Other suitable means to effect contraction may comprise screw operated compression devices or hydraulically operated compression devices or any device whatsoever that can provide the compressive forces to effect contraction of the bodies and thereby push or force material mass through the gaps formed by the bodies.

It is accordingly stressed that FIG. 4 illustrates but one of a wide variety of ways for effecting contractive forces on the two bodies of the mixer. In FIG. 4, two rods 41 and 42 extend upright from a machine bed 43 and serve as the guides for a crosshead 44 as it is lowered. A vessel or extrudate receiver 31 for collecting the material leaving the mixer is centered in a helical spring 45 extending upwards from the machine bed. At the top of the helical spring is a wood block 46 for supporting a first or base or lower body 10 of the mixer. The wood block 46 suitably has a hole or opening in its center to allow extrudate to drop from exit 30 of base body 10 into the collecting vessel 31. A wood block 47 is suitably placed between the upper surface of the second body 20 or upper cup of the mixer and the crosshead 44. A locking means or threaded friction pin 48 may be employed to hold the crosshead 44 at a predetermined location along the guide rods after the crosshead is lowered against spring 45. The spring 45 then effects a gradual and smooth compressive force on the bodies 10 and 20 to effect their contraction together. Illustrated also in FIG. 4 is a mass 50 surrounding the base 10 or lower body of the mixer. This mass suitably comprises a jacket. The jacket suitably is equipped with electrical resistent heating elements at its inner portion nearest the first body 10 of the mixer. Alternatively the jacket of mass 50 may consist of heat insulative material, in which case the jacket is wrapped around the mixer in a manner to retain the heat of preheated mixer bodies 10 and 20. Any of a variety of heating means may be employed to maintain the mixer bodies at temperatures those skilled in the art recognize to be satisfactory or needed for the material or mass they select for treatment in the mixer. Resistance heating elements may be incorporated as part of the bodies; heated fluids may be circulated through passageways formed in the bodies. Higher temperatures may be used where the premix consists of a polymer and plasticizer without any catalyst or hardener. Where catalysts or hardeners are in the premix, the temperature and time of exposure should be limited so as to avoid triggering those reactions. Elevated temperatures desirably reduce the viscosity of the material being treated and thereby reduce the force needed to for contractive movement of the bodies.

The width of gaps 100 and 200 should not exceed about 1 millimeter for the most effective practice of shear mixing according to the invention, although a width for the gaps up to about 2 millimeters might give satisfactory results under rare circumstances such as for exceedingly highly polymerized components where a relatively low degree of shear mixing is to be accomplished but yet a satisfactory shear mixing operation is considered important. To be emphasized, however, is that gap widths even as small as 0.1 millimeter (e.g., the micron range) can be useful, and especially useful for the shear mixing of low viscosity masses of materials, whether that low viscosity is characteristic of the mass at normal room temperature or is achieved by employing by elevated temperatures for the mixing step. A convenient gap width for the shear mixing of a variety of masses of polymeric materials is about 0.5 millimeter.

One of the most significant advantages of the invention is that the design of the bodies permits, for the first time insofar as known, effective shear mixing of extremely small experimental masses of materials. For example, a premix mass totaling as few as 5 grams, or even possibly less, may be shear mixed using the teachings of the invention. Generally, however, premix masses subjected to shear mixing will be on the order 7 or 10 or 15 grams or possibly even 25 or 30 grams. Such amounts still fall in the low quantity category not easily shear mixed using any earlier known equipment. Of course, even larger premix masses may be shear mixed using the teachings of the invention. In that regard, the invention may be used to shear mix masses even in excess of 100 grams or more. The primary benefit of the invention however is that it provides a shear mixing system sorely needed for the shear mixing of small masses for laboratory pre-testing and experimental purposes.

The first and second bodies forming the key elements for the practice of the invention may be fabricated from metal such as steel or any other suitable metal in sizes about the size of or smaller than a clenched fist. A test apparatus consisting of the upper and lower bodies illustrated in the FIG. 3 has been constructed to have overall external dimensions of about 8 centimeters (about 3 inches) in height--measured with the upper body or cup fully contracted into the lower body or cup—and about 6 centimeters (about 2.5 inches) for the outer diameter of the lower body or cup. It will therefore readily be seen that the invention permits convenient shear mixing with exceedingly small elements of apparatus, quite literally about the size as illustrated in FIGS. 1 through 3.

The linear length of the gaps 100 and 200, that is, the length of those gaps in the axially or longitudinal direction, does increase as the two bodies of the mixer are contracted or pushed together. The minimum or shortest linear length for shear mixing should be no less than 25 times the width of the gaps and most preferably is much more. As the bodies are pushed together, the linear length of each gap increases and the final material passing through the gaps is subjected to shear mixing in each gap over a length of at least 50 times the width of a gap.

Expressed in terms of the linear length of gap wall surfaces, the length of the first or primary wall surface 16 of the first gap 100 (between the interior surface 13 of base wall 12 and the piston end surface 18 of that first wall 16) should be equal to or substantially equal to the linear length of the opposing wall surface 28 for the first gap (between the piston 29 of that opposing wall and the limit surface 23 of the limit wall 22). The linear length of the first wall surface 16 and the opposing wall 28 in every instance should exceed about 25 times the width of gap 100 and usually will exceed 50 times its width and most preferably will exceed 100 times its width. That linear length may be greatly extended so as to even exceed 200 or more times the width of the first gap. Comparable considerations go into the formation of the linear length of the second gap; and it will be readily appreciated that the illustrated design shows the first or primary wall surface 26 of the second gap to be of greater linear length than the first wall surface of the first gap, and the opposing wall surface 17 of the second gap likewise to be of greater linear length than the opposing wall surface 28 for the first gap.

Most ideally the widths of the first and second gaps are substantially equal, but the width of one gap may be varied from the width of the other. For example, the width of the first gap 100 may suitably be larger than the width of the second gap 200 for the shear mixing of a variety of polymeric material. Under such circumstances, the shear mixing effected during the passage of the materials through the first gap might be looked upon as but a prelude to the shear mixing occurring in the second gap.

Either or both of the side surfaces forming a gap may be relatively smooth and suitably are relatively smooth. To some degree however, shear mixing may be enhanced by forming those surfaces with a design of relatively minute irregularities. This principle is illustrated in FIGS. 1 and 2 by a schematic showing of parallel lines 32 that represent small grooves lying in the transverse direction (circumferential direction) to the passage of material through the gaps. Another illustrative pattern of minute irregularities is represented by a cross-hatching or X pattern 33 of grooved elements or striations. A minute pattern of irregularities can contribute to effective shear mixing, but such a pattern is not always critically required.

A four component system was selected for experimental purposes. The four component system consisted of gram quantities of a carboxylated polyester resin and two Bis-phenol A based epoxy resins in an approximate mass ratio of 70/15/15, plus a milligram quantity of cross-linking or curing catalyst. These components were ground together with a laboratory grinder to fine powders. An illustrative Differential Scanning Calorimetry (DSC) analysis for this mixture (not subjected to shear mixing) is illustrated by the plot of FIG. 5. The plot is that of the Heat Flow in Watts per gram (W/g) against temperature in degrees Celsius. Three distinct and separate drops or depressions representing the glass transition temperatures (Tg) of the three resin components are evident. The exact glass transition temperatures are not important; the only thing important in the illustration of FIG. 5 is that each resin component exhibited its distinct glass transition temperature.

Figure 6:
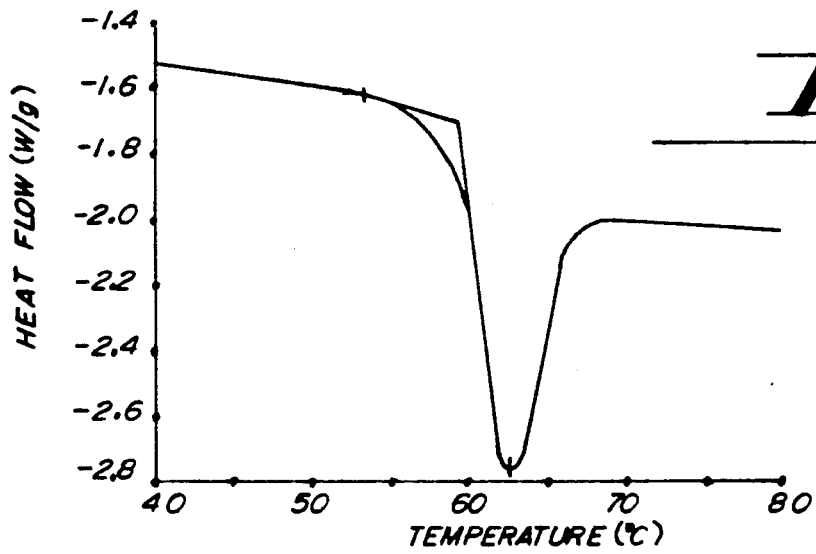
FIG. 6 is a plot illustrating the single glass transition temperature for the same four component system after being shear mixed using a commercially available laboratory extruder.

This four component mixture is altered favorably (but without triggering catalytic action) by shear mixing using a known commercially available laboratory extruder (i.e., one wherein a screw is rotated to force material forwardly for shearing between the screw and fixed housing walls). The result of this is illustrated by the plot of FIG. 6, showing a single glass transition temperature for the three resin system. Again, the exact glass transition temperature is not important for purposes here. The only thing important for purposes here is that the shear mixing using an old known shear mixer converted the four component system into what might be called a uniform mass exhibiting at least some properties commonly looked upon as being characteristic of a single component system.

Figure 7:
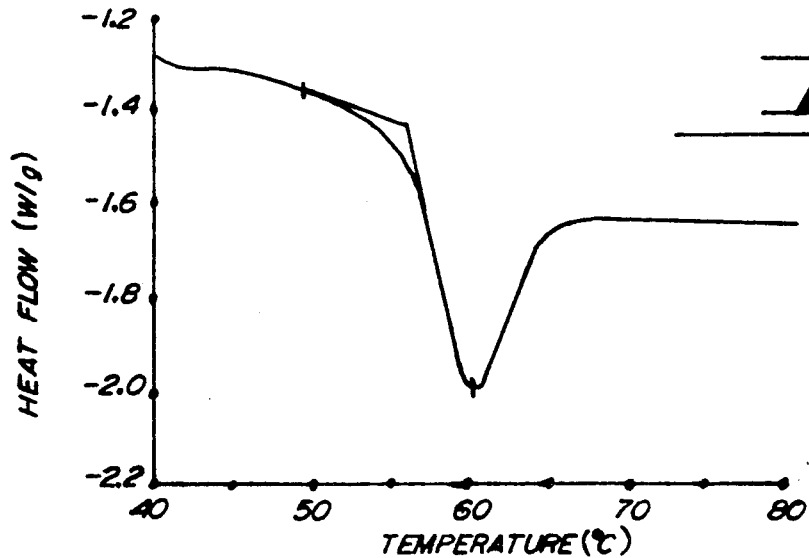
FIG. 7 is a plot illustrating the single glass transition temperature for the same four component system after being shear mixed using the mixer of this invention.

Shear mixing of the same four component system using the mixer of this invention likewise converted the four component system into a uniform mass exhibiting a single glass transition temperature which, within experimental accuracy, is the same as that shown in FIG. 6; and the plot for this is illustrated in FIG. 7. This plot is not identical to that of FIG. 6, but variation can be expected depending on parameters not relevant here.

The mixer bodies of the invention employed in this test were of a size as discussed specifically above—a size close to that literally illustrated in the drawings. They were formed of steel. The steel bodies were preheated to a selected processing temperature of 125 degrees Celsius. That temperature was insufficient to trigger catalytic action during the shear mixing of the four component system in view of the moderate thermal exposure time of treatment (about 1.5 minutes total processing time for a 10 gram premix).

The premix of the four component system was placed in the premix space and the upper body or second body was then inserted into the lower one in the posture or orientation illustrated in FIG. 3. (It was found unnecessary to continue heating during processing because the heat stored in the metal was sufficient to melt the resins of the four component system and keep them molten during the short processing time. Several tests were conducted using varying quantities of premix, namely 7, 10, and 15 gram amounts.)

The two bodies were then placed in the assembly illustrated in FIG. 4, with an insulating jacket employed. The movable crosshead was lowered at maximum speed (about 50 cm/min.) and stopped and locked in position when the applied load was approximately 6.7 kilonewtons (kN) or about 1500 pounds force (lbf). The spring had a stiffness of about 49kN/m (250 lbs/in.). The procedure to this point took about 45 to 60 seconds and extrusion did not occur during this time. As the sample in the premix space melted, the compressed spring effected a gradual and smooth driving of the two bodies into one another which in turn forced the melt in the premix chamber up through the first gap into the intermediate space of the upper body and then down through the second gap and out the lower opening or extrudate exit. The shear mixed sample was collected in the beaker underneath the mixer.

Promptly on completion of each shear mixing extrusion, the hot mixer body parts were disassembled and cooled in dry ice and soaked in acetone for cleaning.

Repeated tests indicated that the first material to leave the mixer has the least degree of shear mixing due to the initially relatively shorter gap lengths. As the gaps increase in length on contractive movement of the two bodies together, the degree of shear mixing increases. The last material to leave the mixer is subjected to the longest passage through the gaps of the mixer and is therefore the most thoroughly shear mixed portion.

Those skilled in the art of shear mixing will appreciate that the amount of compressive force to effect contraction of the bodies 10 and 20 for shear mixing is dependent on a multitude of factors, not least of which is the viscosity of the mass at the temperature selected for treatment. The internal pressure may vary from a pressure as low as about one Megapascal (MPa) or 150 pounds force per square inch for low viscosity or thin materials up to possibly as much as 15 MPa or 2,200 pounds force per square inch for mixtures of highly polmerized resins and high viscosity masses. The selection of the degree of force is a matter for the judgment of those skilled in the art.

Those skilled in the art also will recognize that resinous polymers in melted condition generally are so viscous that mere turbulence for mixing does not contribute significantly to a shearing effect. The merit of shear mixing using preferred narrow-gap apparatus of this invention is that large velocity gradients are set up in the material traveling through the mixer gaps. This causes neighboring molecules to move relative to one another and to be stretched and intertwined as the mass travels through the narrow gaps. The result is analogous to that of homogenization.

The invention may be embodied in other specific forms than illustrated without departing from the spirit or essential characteristics thereof. The illustrated embodiment is therefore to be considered in all respects illustrative and not restrictive, the scope of the invention being indicated by the appended claims rather than by the foregoing description; and all changes which come within the meaning and range of equivalency of the claims are therefore intended to be embraced thereby.

That which is claimed is:

1. A mixer for polymeric materials, comprising a first body having a primary wall surface for a mixing gap, and a second body having an opposing wall surface for said mixing gap, said first and second bodies being linearly slideable with respect to each other, said second body being oriented to said first body so that said opposing wall surface is in parallel spaced relationship to said primary wall surface, whereby contractive movement of said first and second bodies together in a linear direction parallel with said primary and opposing wall surfaces effectively lengthens the linear length of said mixing gap.

2. The mixer of claim 1 wherein said first body includes a premix space and said second body includes a plunger for pushing material from said premix space through said mixing gap.

3. The mixer of claim 2 wherein said opposing wall surface for said mixing gap is carried on said plunger and moves in a direction opposite to that of the movement of material through said mixing gap during contractive movement of said first and second bodies together.

4. A mixer for polymeric materials, comprising two mateable bodies that, when pressed in mating condition together, form a reverse flow path for the movement of the material being mixed, said mixer having a premix space in one of said bodies and an intermediate space in the other of said bodies, and a first gap defined by spaced wall surfaces through which material in said premix space exits said premix space in a first direction into said intermediate space and a second gap defined by spaced wall surfaces through which material in said intermediate space exits said intermediate space in a second directing as said bodies are pressed in mating condition together, said second direction being opposite and essentially parallel to said first direction.

5. The mixer of claim 4 wherein one of the spaced wall surfaces of said first gap is on one of said bodies and another of the spaced wall surfaces of said first gap is on the other of said bodies, whereby the length of said first gap increases as said bodies are pressed together.

6. The mixer of claim 4 wherein said spaced wall surfaces of said first gap comprise a primary wall surface and an opposing wall surface, and wherein said opposing wall surface moves in a direction opposite to the direction of travel of material through said first gap as said bodies are pressed in mating condition together.

7. The mixer of claim 4 wherein the other of said bodies includes a plunger for pushing material from said premix space through said first gap.

8. The mixer of claim 7 wherein said plunger includes a surface which forms one of the spaced wall surfaces of said first gap.

9. The mixer of claim 4 wherein the width of the first gap is no greater than 1 mm.

10. A mixer for polymeric materials, comprising first and second mateable bodies:

said first body defining an annular premix space having a terminal base wall, an outer annular housing wall extending from said terminal base wall on the radially outer side of said premix space, and a radially inner annular base plunger extending from said terminal base wall on the radially inner side of said premix space, said base plunger defining at its radially outer side a primary wall surface for a linear first gap and defining at its radially inner side an opposing wall surface for a linear second gap, said second body defining an annular intermediate space having a terminal limit wall, an annular primary plunger extending from said terminal limit wall on the radially outer side of said intermediate space, and an annular core wall extending from said terminal limit wall on the radially inner side of said intermediate space, said annular primary plunger defining at its radially outer side a surface for sealing relationship with said housing wall of said first body and defining at its radially inner side an opposing wall surface for said linear first gap, said core wall defining at its radially outer side a primary wall surface for said linear second gap, and said bodies being mateable in a manner such that said primary and opposing wall surfaces of said first gap as well as said second gap are in parallel spaced relationship.

11. The mixer of claim 10 additionally comprising means for pressing said first and second bodies together in said mateable relationship to cause said primary plunger of said second body to push material out of said premix space through said linear first gap into said intermediate space while said annular base plunger simultaneously moves into said intermediate space and contributes to the pushing of material out of said intermediate space through said second gap, said opposing walls of said first and second gaps being moved in a direction opposite to the passage of material through said gaps as said bodies are pressed together.

12. The mixer of claim 10 wherein the axial direction length of said primary wall surface and said opposing wall surface for said linear first gap are each at least 25 times the width of said first gap between said primary and opposing wall surfaces of said first gap, and wherein said width of said first gap is no greater than 1 mm.

13. The mixer of claim 10 wherein the width of said first and second gaps between the primary and opposing wall surfaces thereof is no greater than 1 mm.

14. A method of mixing a polymeric mass, comprising pushing the polymeric mass through a mixing gap defined by spaced apart wall surfaces while simultaneously increasing the length of the gap as the mass is pushed therethrough.

15. The method of claim 14 including the preliminary step of assembling apparatus to form said spaced apart wall surfaces at a spacing no greater than 1 mm for said mixing gap.

16. The method of claim 14 including the step of moving one wall surface of said mixing gap in a direction opposite to the direction of movement of the mass through said gap.

17. The method of claim 14 wherein the mass travels in a first linear direction as it is pushed through said mixing gap, said method including the step of pushing the mass in a second linear direction through a second mixing gap defined by spaced apart wall surfaces, said second linear direction being parallel and opposite to said first linear direction.

18. The method of claim 17 including the step of moving one wall of said second mixing gap in a direction opposite to the direction of movement of the mass through said second gap.

19. A mixer for polymeric materials, comprising a first body having a primary wall surface for a mixing gap, and a second body having an opposing wall surface for said mixing gap, said first body including a premix space and said second body including a plunger for pushing material from said premix space through said mixing gap, said second body being oriented to said first body so that said opposing wall surface is in parallel spaced relationship to said primary wall surface, whereby contractive movement of said first and second bodies together in a linear direction parallel with said primary and opposing wall surfaces effectively lengthens the linear length of said mixing gap.

20. The mixer of claim 19 wherein said opposing wall surface for said mixing gap is carried on said plunger and moves in a direction opposite to that of the movement of material through said mixing gap during contractive movement of said first and second bodies together.

* * * * *

UNITED STATES PATENT AND TRADEMARK OFFICE
CERTIFICATE OF CORRECTION

PATENT NO. : 5,125,752
DATED : Jun. 30, 1992
INVENTOR(S) : Hans J. Goettler and Victoria D. Kuntz It is certified that error appears in the above-identified patent and that said Letters Patent is hereby corrected as shown below:

On the cover sheet, at the line starting "[21] Appl. No.:", the number "621,447" should read --621,441--.

Signed and Sealed this

Twenty-first Day of September, 1993

Attest:

BRUCE LEHMAN

Attesting Officer

Commissioner of Patents and Trademarks